United States Patent
Mizutani et al.

(10) Patent No.: US 10,634,640 B2
(45) Date of Patent: Apr. 28, 2020

(54) GAS SENSOR INCLUDING SENSOR ELEMENT, HOUSING, AND ELEMENT COVER

(71) Applicant: DENSO CORPORATION, Kariya, Aichi-pref. (JP)

(72) Inventors: Keisuke Mizutani, Kariya (JP); Nobuyuki Tsuji, Kariya (JP)

(73) Assignee: DENSO CORPORATION, Kariya (JP)

( * ) Notice: Subject to any disclaimer, the term of this patent is extended or adjusted under 35 U.S.C. 154(b) by 310 days.

(21) Appl. No.: 15/323,221

(22) PCT Filed: Jun. 29, 2015

(86) PCT No.: PCT/JP2015/068638
§ 371 (c)(1),
(2) Date: Dec. 30, 2016

(87) PCT Pub. No.: WO2016/002699
PCT Pub. Date: Jan. 7, 2016

(65) Prior Publication Data
US 2017/0146482 A1  May 25, 2017

(30) Foreign Application Priority Data
Jun. 30, 2014 (JP) .................. 2014-133485

(51) Int. Cl.
*G01N 27/409* (2006.01)
*G01N 27/407* (2006.01)

(52) U.S. Cl.
CPC ....... *G01N 27/4077* (2013.01); *G01N 27/409* (2013.01)

(58) Field of Classification Search
CPC .............. G01N 27/4077; G01N 27/409; F01N 2560/00–027
See application file for complete search history.

(56) References Cited

U.S. PATENT DOCUMENTS 6,344,118 B1 * 2/2002 Kobayashi ......... G01N 27/4075
204/421
2003/0019280 A1   1/2003 Toguchi et al. .............. 73/31.05
(Continued)

FOREIGN PATENT DOCUMENTS

| JP | 2009-80100 | 4/2009 |
| JP | 2016-11883 | 1/2016 |

OTHER PUBLICATIONS

International Search Report for PCT/JP2015/068638, dated Sep. 29, 2015, 4 pages.

*Primary Examiner* — Alexander S Noguerola
(74) *Attorney, Agent, or Firm* — Nixon & Vanderhye P.C.

(57) ABSTRACT

A gas sensor includes a sensor element having a measuring electrode and a reference electrode, a housing accommodating the sensor element, and an element cover including an inner cover having an inner side wall section and an inner bottom wall section, and an outer cover having an outer side wall section and an outer bottom wall section. Inner side surface holes and outer side surface holes are formed in the inner side wall section and the outer side wall section. Inner bottom surface holes and outer bottom surface holes are formed in the inner bottom wall section and the outer bottom wall section. The ratio of the total surface area of the outer side surface holes with respect to the total surface area of the inner bottom surface holes is 8 to 47. The total surface area of the inner side surface holes is 2 to 8 $mm^2$.

11 Claims, 11 Drawing Sheets

(56) References Cited

U.S. PATENT DOCUMENTS

| | | | |
|---|---|---|---|
| 2004/0050695 A1* | 3/2004 | Haraguchi | G01N 27/419 204/424 |
| 2004/0129069 A1* | 7/2004 | Sakawa | G01N 27/4077 73/114.32 |
| 2004/0144645 A1 | 7/2004 | Yamada et al. | 204/424 |
| 2007/0095662 A1* | 5/2007 | Suzuki | G01N 27/4071 204/424 |
| 2007/0169534 A1 | 7/2007 | Satoh et al. | 73/1.06 |
| 2008/0028831 A1 | 2/2008 | Nakashima et al. | 73/31.05 |
| 2013/0092537 A1* | 4/2013 | Mizutani | G01N 27/419 204/427 |
| 2013/0306475 A1 | 11/2013 | Suzuki et al. | 204/429 |

* cited by examiner

BASE-END SIDE

TIP-END SIDE

GAS SENSOR INCLUDING SENSOR ELEMENT, HOUSING, AND ELEMENT COVER

This application is the U.S. national phase of International Application No. PCT/JP2015/068638 filed Jun. 29, 2015, which designated the U.S. and claims priority to JP Patent Application No. 2014-133485 filed Jun. 30, 2014, the entire contents of each of which are hereby incorporated by reference.

BACKGROUND OF THE INVENTION

Technical Field

The present disclosure relates to a gas sensor that detects a specified gas concentration in a gas to be measured.

Background Art

A gas sensor that detects a specified gas concentration (for example, oxygen concentration) in a gas to be measured such as exhaust gas is provided in an exhaust system of an internal combustion engine or the like of a vehicle. This gas sensor includes a sensor element, a housing, and an element cover. The sensor element has a solid electrolyte body, and a measuring electrode and a reference electrode that are respectively provided on one surface and another surface of the solid electrolyte body. The housing has the sensor element inserted thereinto. The element cover is provided on the tip-end side of the housing.

One purpose for providing the element cover is for preventing liquid drops such as water drops carried with a gas to be measured such as exhaust gas from adhering to the sensor element (hereinafter, the adhesion of such liquid drops to the sensor element will be appropriately referred to as "liquid adhesion"). There is a concern that when liquid drops adhere to the sensor element, stress occurs in the sensor element, causing the element to crack. Therefore, liquid adhesion on the sensor element is prevented by the element cover. This function of the element cover will hereinafter be referred to as "liquid adhesion prevention function".

In order that the gas to be measured sufficiently reaches well a detection section (measuring electrode) of the sensor element, vent holes are formed in the element cover. In other words, in order that the gas to be measured is thoroughly introduced inside the element cover and discharged from the element cover, it is necessary to form vent holes, and thus ensure the responsiveness of the gas sensor.

However, generally, the responsiveness and the liquid adhesion prevention function are in a conflicting relationship. In the past, various studies have been performed on the configuration of an element cover. In JP-A-2012-018188, for example, the configuration of an element cover is studied to achieve both responsiveness and a liquid adhesion prevention function.

CITATION LIST

Patent Literature

PTL1: JP-A-2012-018188

However, in recent years, the need for both responsiveness and a liquid adhesion prevention function in gas sensors has increased. In other words, as the areas where vehicles are used become more diversified, diversification of oils and fuels used in each area, enforcement of exhaust gas regulations, requirements for a reduction in fuel consumption, and the like, are further increasing. Therefore, achieving both a higher level of responsiveness and a liquid adhesion prevention function is required for gas sensors.

SUMMARY

Hence, it is desired to provide a gas sensor capable of achieving both high responsiveness and a liquid adhesion prevention function.

An aspect of the present disclosure is a gas sensor that includes a sensor element, a housing, and an element cover. The sensor element has an oxygen ion conductive solid electrolyte body, and a measuring electrode and a reference electrode that are respectively provided on one surface and another surface of the solid electrolyte body. The housing has the sensor element inserted thereinto. The element cover is disposed on the tip-end side of the housing. The element cover has an inner cover disposed so as to cover the tip-end section of the sensor element from the outer-peripheral side and from the tip-end side, and an outer cover disposed so as to cover the inner cover from the outer-peripheral side and from the tip-end side. The inner cover has an inner side wall section along the axial direction, and an inner bottom wall section that is provided on the tip-end side of the inner side wall section and intersects with the axial direction. The outer cover has an outer side wall section along the axial direction, and an outer bottom wall section that is provided on the tip-end side of the outer side wall section and intersects with the axial direction. Inner side surface holes formed in the inner side wall section are positioned further on the base-end side than the measuring electrode, while outer side surface holes formed in the outer side wall section are positioned further on the tip-end side than the inner side surface holes. Inner bottom surface holes formed in the inner bottom wall section are positioned further on the tip-end side than the measuring electrode, while outer bottom surface holes formed in the outer bottom wall section are positioned on an outer side of the inner bottom surface holes. The ratio of the total surface area of the outer side surface holes with respect to the total surface area of the inner bottom surface holes is 8 to 47. The total surface area of the inner side surface holes is 2 to 8 mm$^2$.

Advantageous Effects of the Invention

In the gas sensor described above, with the positional relationship of the measuring electrode, the inner side surface holes, the outer side surface holes, the inner bottom surface holes, and the outer bottom surface holes being defined as described above, the ratio of the total surface area of the outer side surface holes with respect to the total surface area of the inner bottom surface holes (hereinafter, simply referred to as "total surface area ratio"), and the total surface area of the inner side surface holes are defined to be within ranges such as described above. The inventors considered that the total surface area ratio and the total surface area of the inner side surface holes described above greatly affect the ease with which fresh gas to be measured reaches the measuring electrode of the sensor element, resulting in a substantial impact on both responsiveness and a liquid adhesion prevention function. The inventors took notice of this point, and as a result of investigation as will be described later, learned that a gas sensor having the configuration as described above is capable of achieving both high responsiveness and a liquid adhesion prevention function.

As mentioned above, with the present disclosure, a gas sensor can be provided that is capable of achieving both high responsiveness and a liquid adhesion prevention function.

DETAILED DESCRIPTION OF PREFERRED EMBODIMENTS

For example, the aforementioned gas sensor in use is disposed in an exhaust system of an internal combustion engine or the like of a vehicle. As used herein, the side of the gas sensor that is inserted into the exhaust system or the like is referred to as "tip-end side", and the opposite side is referred to as "base-end side". Unless specially stated, the axial direction refers to the axial direction of the gas sensor. The total surface area of the inner bottom surface holes, for example, means the total surface area of all of the holes in the inner bottom surface when there are a plurality of holes in the inner bottom surface, and when there is one hole in the inner bottom surface, means the surface area of that one hole in the inner bottom surface. The same is true for the total surface area of the outer side surface holes and the total surface area of the inner side surface holes.

EMBODIMENTS

First Embodiment

With reference to FIGS. 1 to 7, embodiments of a gas sensor will be described.

Figure 1:
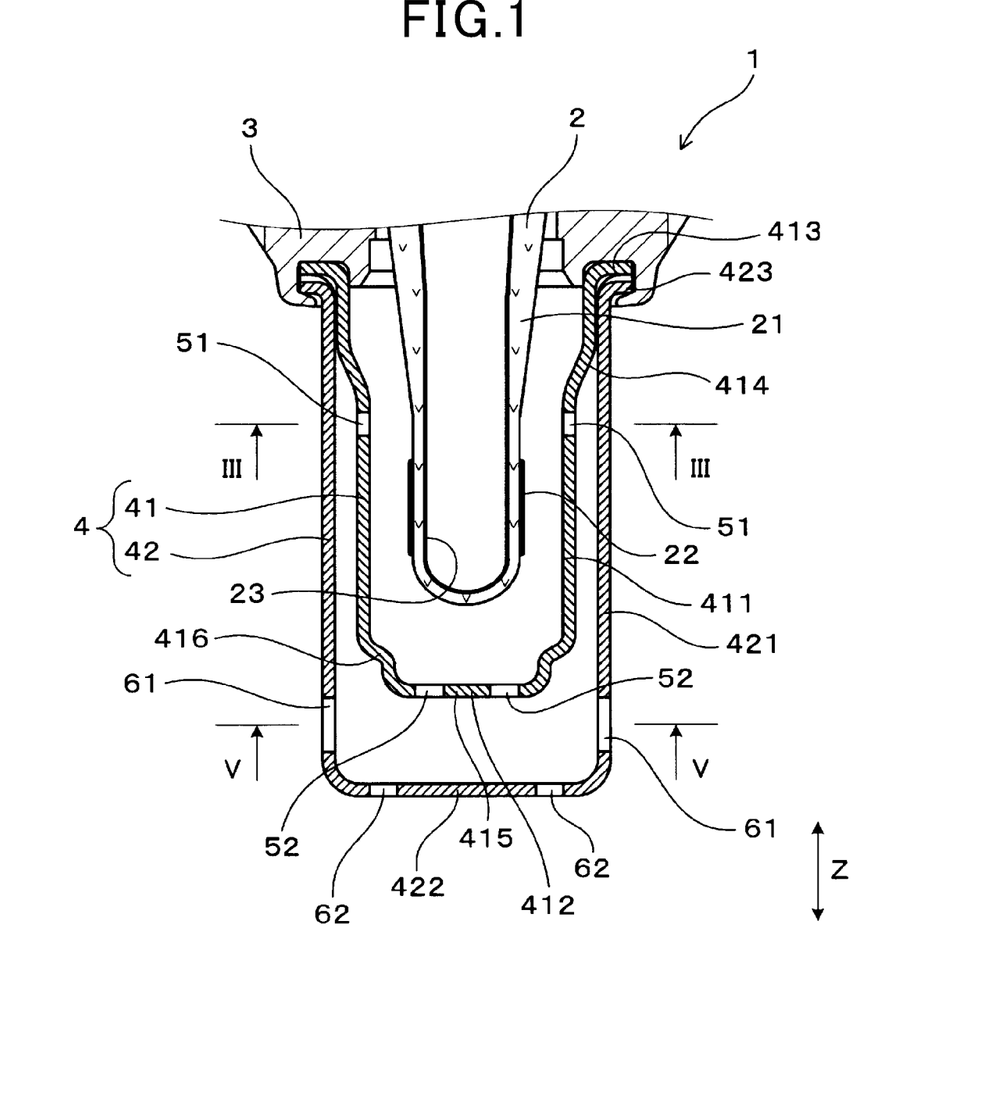
FIG. 1 is a cross-sectional view of the element cover and its surroundings of a gas sensor, according to a first embodiment.
Figure 2:
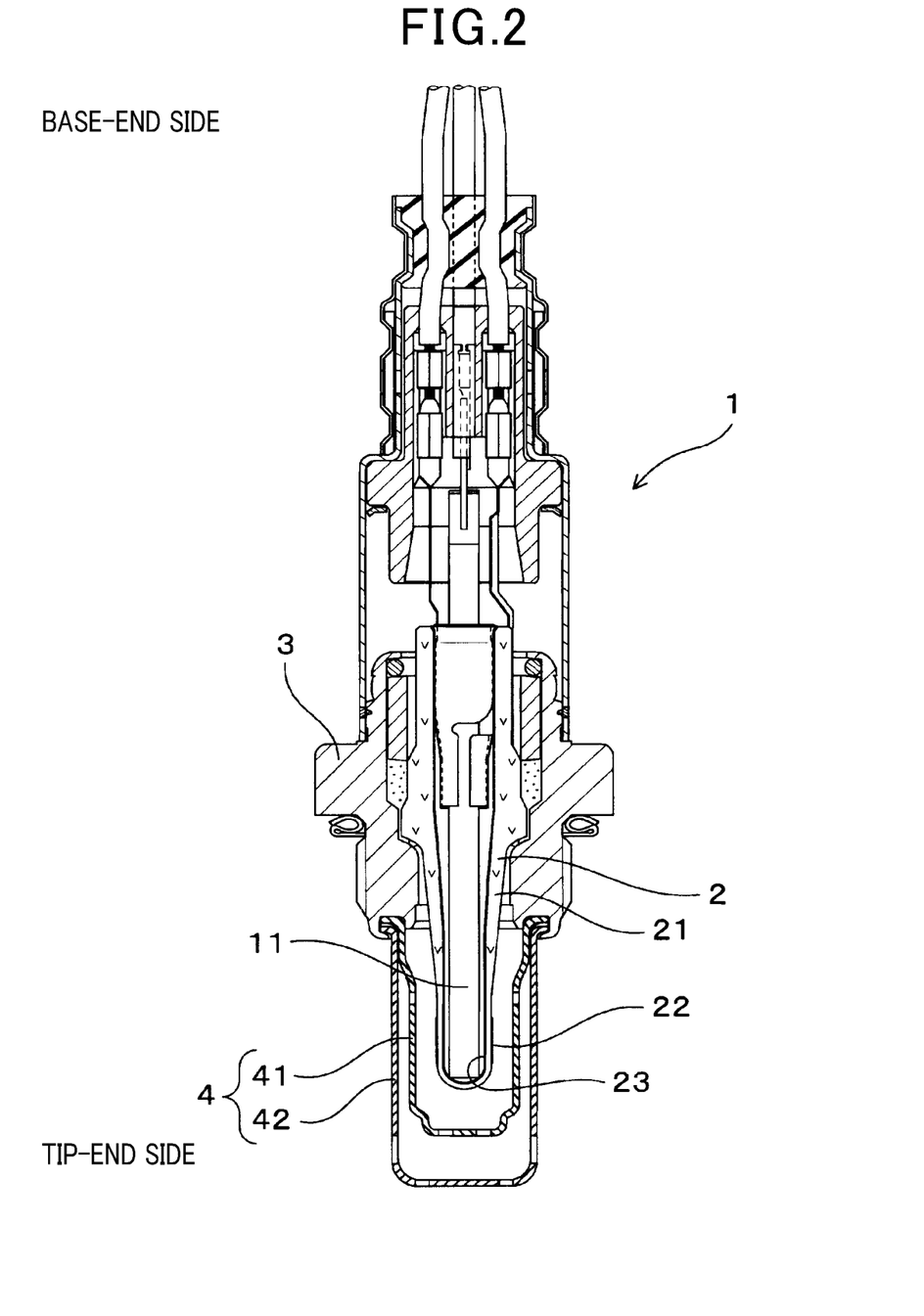
FIG. 2 is a cross-sectional view of the gas sensor, according to the first embodiment.

As illustrated in FIGS. 1 and 2, a gas sensor 1 of the present embodiment includes a sensor element 2, a housing 3 into which the sensor element 2 is inserted, and an element cover 4 disposed on the tip-end side of the housing 3. The sensor element 2 has an oxygen ion conductive solid electrolyte body 21, and a measuring electrode 22 and a reference electrode 23 that are respectively provided on one surface and another surface of the oxygen ion conductive solid electrolyte body 21.

As illustrated in FIG. 1, the element cover 4 has an inner cover 41 disposed so as to cover the sensor element 2 from the outer-peripheral side and from the tip-end side, and an outer cover disposed so as to cover the inner cover 41 from the outer-peripheral side and from the tip-end side.

The inner cover 41 has an inner side wall section 411 along the axial direction Z, and an inner bottom wall section 412 that is provided on the tip-end side of the inner side wall section 411 and intersects with the axial direction Z. The outer cover 42 has an outer side wall section 421 along the axial direction Z, and an outer bottom wall section 422 that is provided on the tip-end side of the outer side wall section 421 and intersects with the axial direction Z.

Inner side surface holes 51 formed in the inner side wall section 411 are located further on the base-end side than the measuring electrode 22. Outer side surface holes 61 formed in the outer side wall section 421 are located further on the tip-end side than the inner-side surface holes 51. Inner bottom surface holes 52 formed in the inner bottom wall section 412 are located further on the tip-end side than the measuring electrode 22. Outer bottom surface holes 62 formed in the outer bottom wall section 422 are located on an outer side of the inner bottom surface holes 52.

The ratio of the total surface area of the outer side surface holes 61 with respect to the total surface area of the inner bottom surface holes 52 (total surface area ratio) is 8 to 47. The total surface area of the inner side surface holes 51 is 2 to 8 $mm^2$.

The total surface area ratio is preferably 11 to 35, and more preferably is 16 to 30. The total surface area of the inner side surface holes 51 is preferably 3 to 7 $mm^2$, and more preferably is 3.5 to 6 $mm^2$.

The inner bottom surface holes 52 are formed in the inner bottom wall section 412 that is orthogonal to the axial direction Z. Being orthogonal to the axial direction Z includes not only the case where the angle with respect to the axial direction Z is 90°, but also includes the state of being approximately orthogonal. For example, the inner bottom surface holes 52 are formed in the inner bottom wall section 412 that is at an angle, for example, 88 to 92° with respect to the axial direction Z.

The sensor element 2 is formed into a cup shape that is a cylindrical shape with a bottom, with the tip-end side thereof being closed and the base-end side being open. In other words, the solid electrolyte body 21 has a shape of a cup that has a cylindrical shape with a bottom as mentioned above. The measuring electrode 22 is formed on the outer surface of the solid electrolyte body 21, and the reference electrode 23 is formed on the inner surface.

The solid electrolyte body 21 is made of a material containing zirconia as the main component. Both the measuring electrode 22 and the reference electrode 23 are preferably made of a platinum group element. In the present embodiment, in particular, the measuring electrode 22 and the reference electrode 23 are both made of platinum.

The reference electrode 23 is formed approximately over the entire surface of the inside surface of the solid electrolyte body 21, while the measuring electrode 22 is provided on part of the area near the tip-end section of the solid electrolyte body 21. In the present embodiment, the tip end of the measuring electrode 22 is located further on the base-end side than the tip end of the solid electrolyte body 21. Moreover, the measuring electrode 22 is formed throughout the circumference.

The element cover 4 is crimped into the tip-end section of the housing 3 at flange sections 413, 423 on the base end. The inner cover 41 and outer cover 42 are crimped into the housing 3, with the flange sections 413, 423 overlapped.

Figure 3:
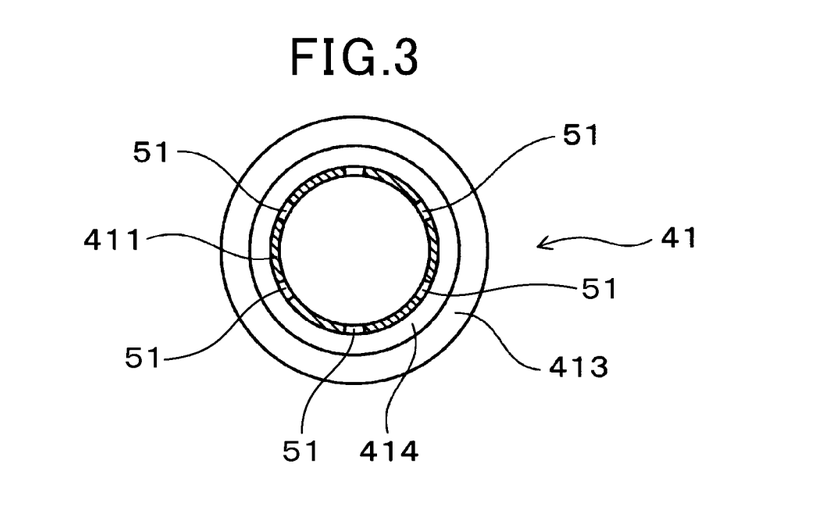
FIG. 3 is a cross-sectional view of an inner cover taken along the line III-III in FIG. 1, according to the first embodiment.

The inner cover 41 has an inclined surface section 414 between the flange section 413 and the inner side wall section 411. The inner side surface holes 51 are formed in the inner side wall section 411 further on the tip-end side than the inclined surface section 414. In other words, the inner side surface holes 51 are formed at locations in the axial direction Z between the inclined surface section 414 and the measuring electrode 22. As illustrated in FIG. 3, six inner side surface holes 51 are formed uniformly spaced in the circumferential direction.

Figure 4:
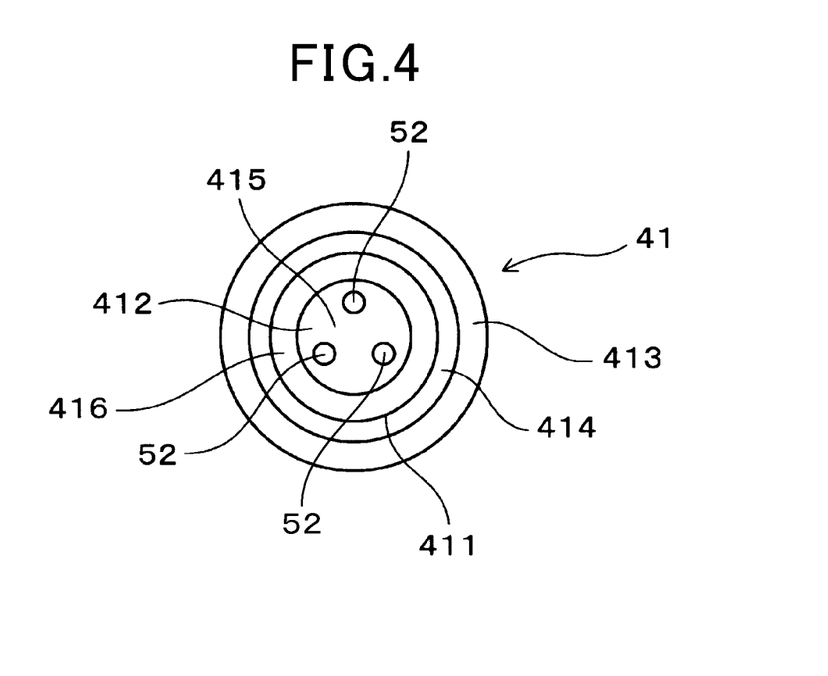
FIG. 4 is a plan view of the inner cover as seen from the tip-end side, according to the first embodiment.

The inner bottom wall section 412 has an orthogonal plane section 415 that is orthogonal to the axial direction Z, and an indented section 416 that is formed along the circumference of the orthogonal plane section 415 so as to be indented toward the inside and connected with the inner side wall section 411. The inner bottom surface holes 52 are formed in the orthogonal plane section 415 of the inner bottom wall section 412. As illustrated in FIG. 4, three inner bottom surface holes 52 are formed.

Figure 5:
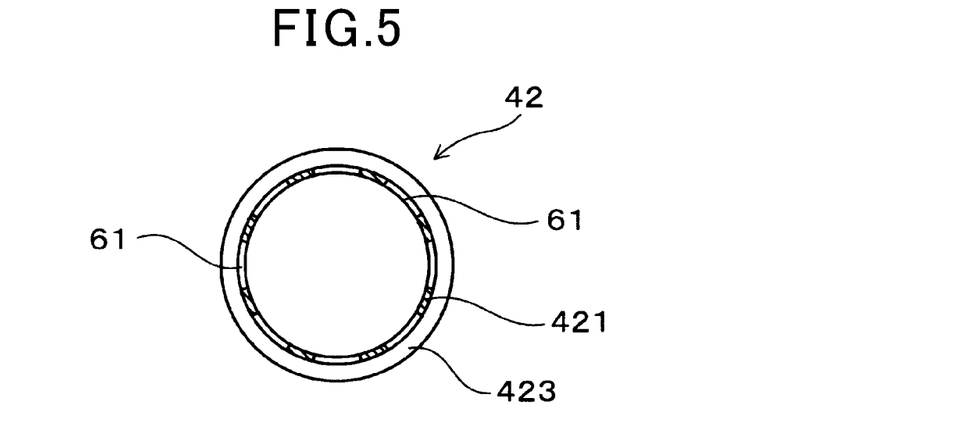
FIG. 5 is a cross-sectional view of an outer cover taken along the line V-V in FIG. 1, according to the first embodiment.

As illustrated in FIG. 1, the outer side wall section 421 of the outer cover 42 is formed so as to extend from the flange section 423 toward the tip-end side. The outer bottom wall section 422 is formed so as to connect to the tip end of the outer side wall section 421, and so as to be orthogonal with respect to the axial direction Z. As illustrated in FIGS. 1 and 5, eight outer side surface holes 61 are formed in locations that are further on the tip-end side than the tip-end section of the sensor element 2, being uniformly spaced in the circumferential direction.

Figure 6:
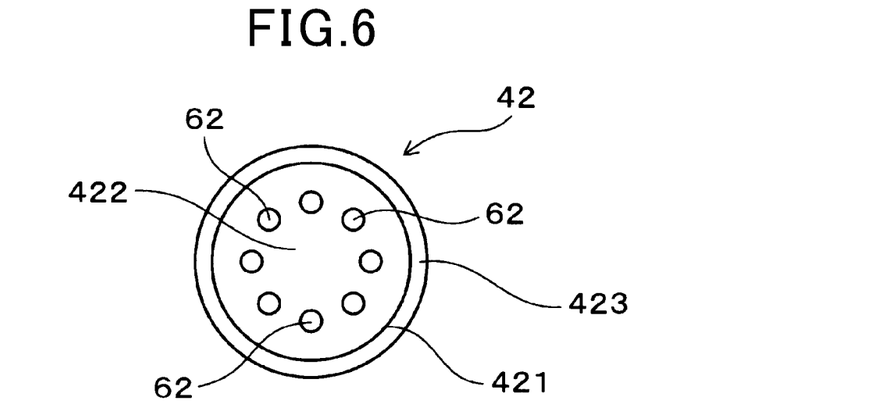
FIG. 6 is a plan view of the inner cover as seen from the tip-end side, according to the first embodiment.
Figure 7:
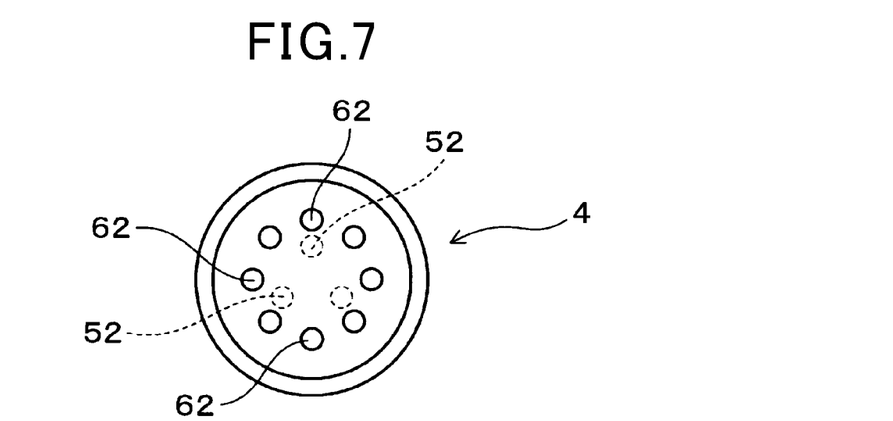
FIG. 7 is a plan view illustrating the positional relationship of the outer bottom surface holes and the inner bottom surface holes, according to the first embodiment.

As illustrated in FIG. 6, eight outer bottom surface holes 62 are formed in the outer bottom wall section 422. As illustrated in FIGS. 1 and 7, these outer bottom surface holes 62 are all formed on an outer side of the inner bottom surface holes 52. The inner bottom surface holes 52, the outer bottom surface holes 62, the inner side surface holes 51, and the outer side surface holes 61 are all circular holes.

As illustrated in FIG. 1, clearance is formed between the inner side wall section 411 and the outer side wall section 421, and clearance is formed between the inner bottom wall section 412 and the outer bottom wall section 422.

The inner side wall section 411 and the outer side wall section 421 are formed into an approximately cylindrical shape along the outer-peripheral surface of the cylindrically-shaped sensor element 2 with a bottom so that the center axis of the sensor element 2 also serves as the center axes of the wall sections.

As illustrated in FIG. 2, a heater 11 for heating the sensor element 2 is disposed on the inside of the sensor element 2. A heating element and a lead section are formed in a heater base material containing aluminum oxide ($Al_2O_3$) as the main component (not illustrated). The heating element and the lead section are made of a material that contains tungsten as the main component, and at least rhenium or molybdenum. The heater 11 has a circular column shape.

The gas sensor 1 of the present embodiment is a rear gas sensor provided downstream of a catalytic filter in an exhaust system of an internal combustion engine. Moreover, the gas sensor 1 of the present embodiment is a limiting current type gas sensor that outputs a limiting current that depends on the concentration of a specified gas (oxygen concentration) in the gas to be measured (exhaust gas) by applying a specified voltage across the measuring electrode 22 and the reference electrode 23.

In other words, in an exhaust system of an automobile engine, the gas sensor 1 is disposed downstream of a catalytic filter that cleans the exhaust gas. The gas sensor 1 outputs a limiting current that depends on the oxygen concentration in the exhaust gas having passed through the catalytic filter. A configuration is possible in which the air-fuel ratio in an air-fuel mixture that is supplied to an internal combustion engine is calculated based on the obtained limiting current, and provided as feedback in an engine control system.

Next, the effects of the present embodiment will be described. In the gas sensor 1, the positional relationship of the measuring electrode 22, inner side surface holes 51, outer side surface holes 61, inner bottom surface holes 52, and outer bottom surface holes 62 is defined as described above, and the ratio of the total surface area of the outer side surface holes 61 with respect to the total surface area of the inner bottom surface holes 52 (total surface area ratio), and the total surface area of the inner side surface holes 51 are defined to be within the ranges described above. This configuration, as will be described below, achieves both high responsiveness and a liquid prevention function.

Moreover, the sensor element 2 is in a cup shape that is a cylindrical shape with a bottom. This structure of the sensor element 2 enables a gas sensor 1 to have high output precision.

Moreover, the gas sensor 1 is a rear gas sensor located downstream of a catalytic filter in an exhaust system of an internal combustion engine. Therefore, this configuration leads to the increase in the level of the responsiveness and liquid adhesion prevention function that are particularly required for the gas sensor 1. With the aforementioned configuration, however, those requirements can be met.

Since the gas sensor 1 is a limiting current type gas sensor, high output precision (stoichiometric precision) can be obtained.

As described above, the present embodiment provides a gas sensor capable of achieving both high responsiveness and a liquid adhesion prevention function.

Second Embodiment

Figure 8:
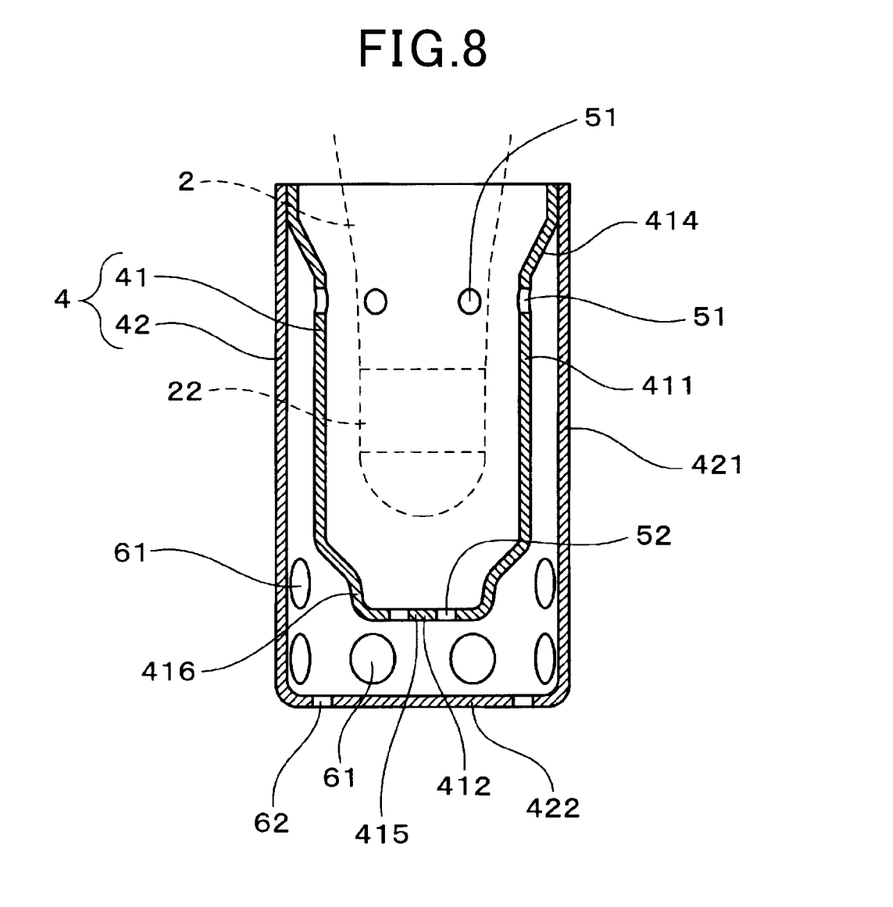
FIG. 8 is a cross-sectional view of the element cover and its surroundings of a gas sensor, according to a second embodiment.
Figure 14:
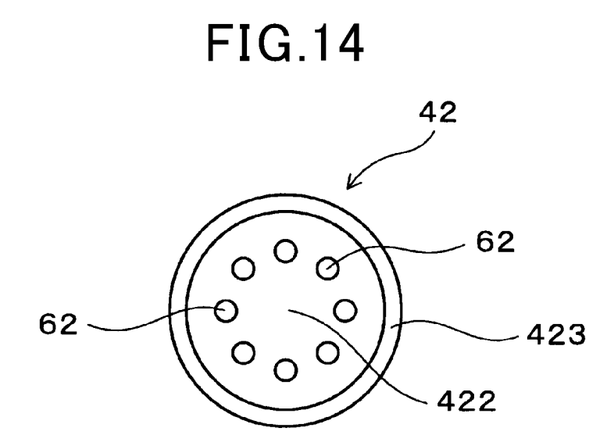
FIG. 14 is a plan view of the outer cover of as seen from the tip-end side, according to the second embodiment.

As illustrated in FIGS. 8 and 14, in the present embodiment, the shape of the gas cover 4 has been changed. FIG. 8 illustrates only a portion of the element cover 4 that is further on the tip-end side than the tip end of the housing 3, omitting the flange sections 413 and 423.

In the gas sensor 1 of the present embodiment, outer side surface holes 61 are formed in the outer side wall section 421 at two locations in the axial direction Z. In other words, eight outer side surface holes 61 in the outer side wall section 421 are formed at locations near the outer bottom wall section 422, and another eight outer side surface holes 61 are formed further on the base-end side than these outer side surface holes 61. The first eight outer side surface holes 61 on the tip-end side are located further on the tip-end side than the inner bottom surface holes 52, and the second eight outer surface holes 61 on the base-end side are located further on the base-end side than the inner bottom surface holes 52.

Figure 9:
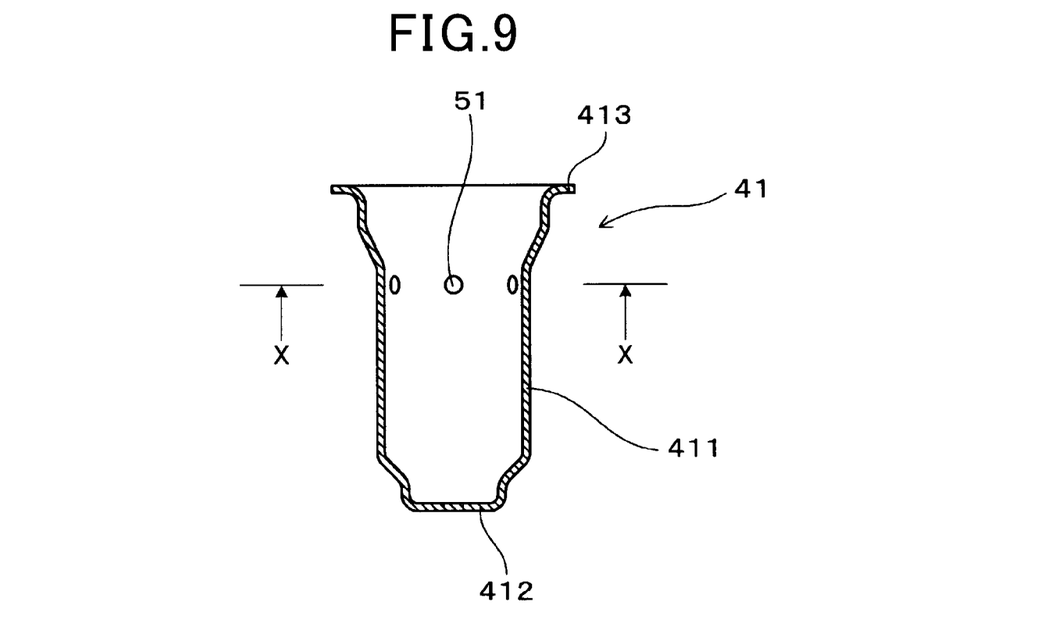
FIG. 9 is a planar cross-sectional view of an inner cover including the center axis, according to the second embodiment.
Figure 10:
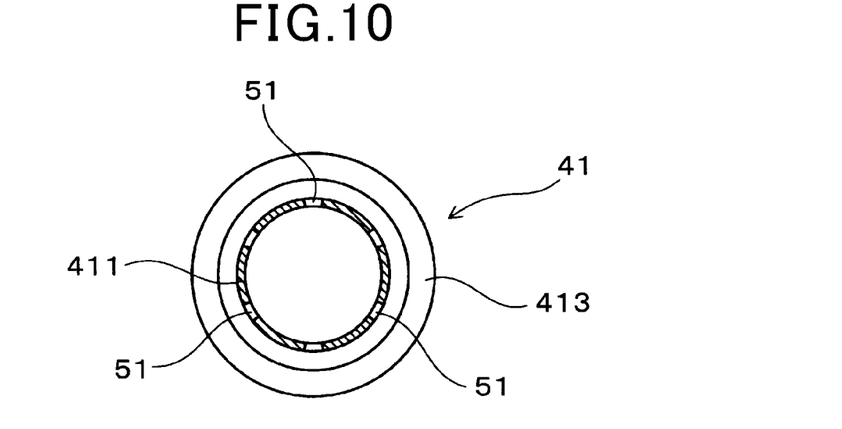
FIG. 10 is a cross-sectional view taken along the line X-X in FIG. 9.
Figure 11:
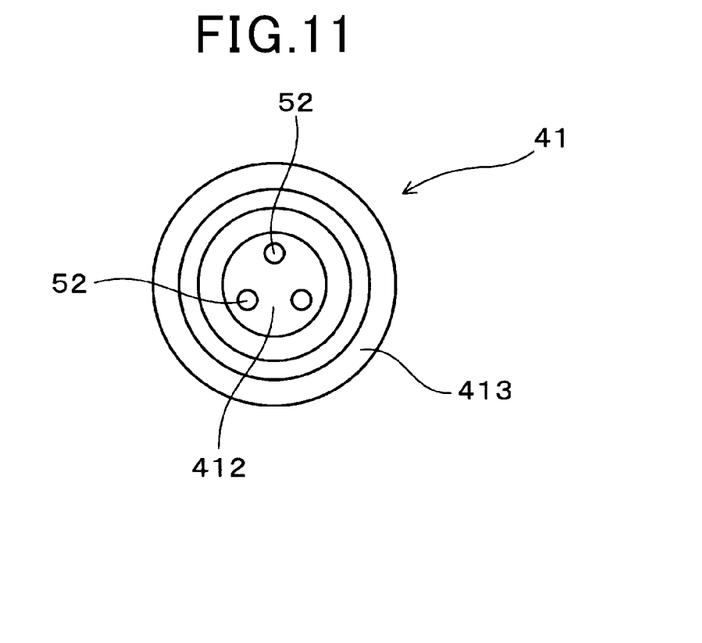
FIG. 11 is a plan view of the inner cover as seen from the tip-end side, according to the second embodiment.

As illustrated in FIGS. 9 to 11, the inner cover 41 has a shape that is approximately identical to that illustrated in the first embodiment. The inner side surface holes 51 have a center that is 12.9 mm away from the tip-end surface of the inner bottom wall section 412. Each of the inner side surface holes 51 is shaped into a circular shape having a 1 mm diameter. Moreover, the inner bottom surface holes 52 have a center separated 1.75 mm from the center axis of the inner cover 41. Each of the inner bottom surface holes 52 is shaped into a circular shape having a 1.2 mm diameter.

Figure 12:
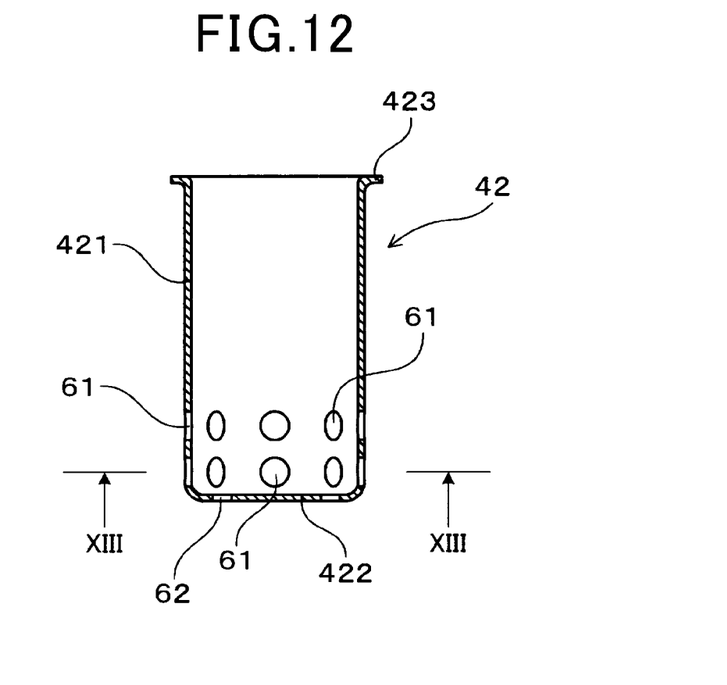
FIG. 12 is a planar cross-sectional view of an outer cover including the center axis, according to the second embodiment.
Figure 13:
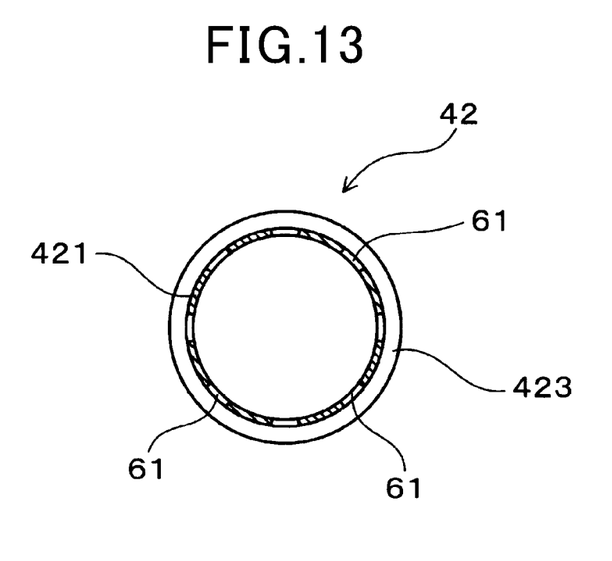
FIG. 13 is a cross-sectional view taken along the line XIII-XIII in FIG. 12.

As illustrated in FIGS. 12 to 14, in the outer cover 42, the first eight outer side surface holes 61 on the tip-end side have a center that is located 2 mm from the tip-end surface of the outer bottom wall section 422, and the second eight outer side surface holes 61 on the tip-end side have a center that is located 5 mm from the tip-end surface of the outer bottom wall section 422. Each of the outer side surface holes 61 is formed into a circular shape having a 2 mm diameter. Moreover, the outer bottom surface holes 62 have a center that is separated 3.6 mm from the center axis of the outer cover 42. Each of the outer bottom surface holes 62 is formed into a circular shape having a 1.2 mm diameter.

The rest of the basic configuration is identical to the configuration of the first embodiment. The gas sensor 1 of the present embodiment is also configured such that the ratio of the total surface area of the outer side surface holes 61 with respect to total surface area of the inner bottom surface holes 52 (total surface area ratio) is 8 to 47, and that the total surface area of the inner side surface holes 51 is 2 to 8 $mm^2$. More specifically, the gas sensor 1 of the present embodiment is configured such that the total surface area of the inner bottom surface holes 52 is 2.6 $mm^2$ and the total surface area of the outer side surface holes 61 is 56.5 $mm^2$, with the aforementioned total surface area ratio being 21.8. Moreover, the total surface area of the inner side surface holes 51 is 4.7 $mm^2$. Unless specifically stated, of the reference signse used in the present embodiment or in the drawings related to the present embodiment, the reference signs identical to those used in the first embodiment indicate components that are the same as in the first embodiment.

Testing according to Examples 1 and 2 described later was performed for the gas sensor 1 of the present embodiment, and as a result the values below were obtained as specific data. In other words, the average response time was 692 ms, and the water mark area was 2.3 $mm^2$.

In this way, the gas sensor of the present embodiment can achieve both high responsiveness and a liquid adhesion prevention function.

Example 1

Figure 15:
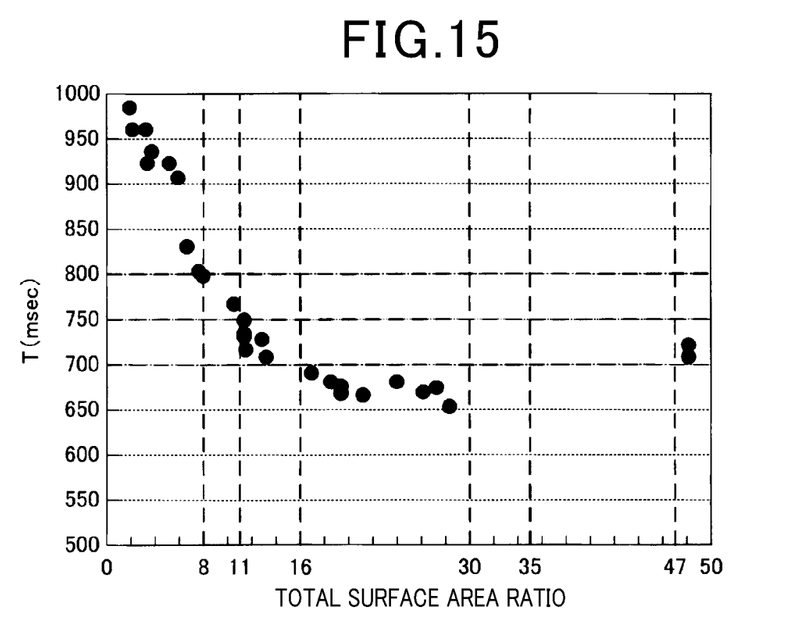
FIG. 15 is a graph illustrating test results of the relationship between the total area ratio and the average response time, according to Example 1.
Figure 16:
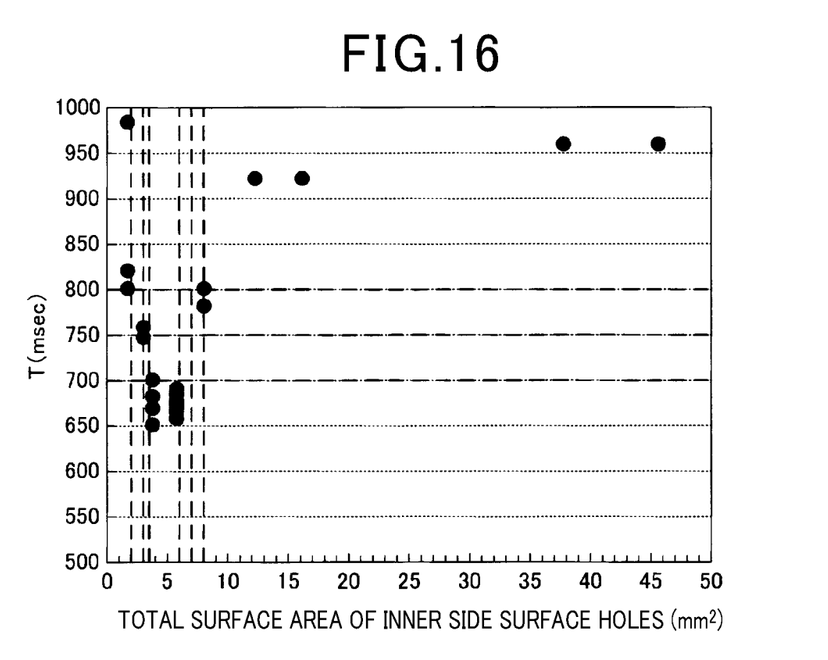
FIG. 16 is a graph illustrating the test results of the relationship between the total surface area of the inner side surface holes and the average response time, according to Example 1.
Figure 17:
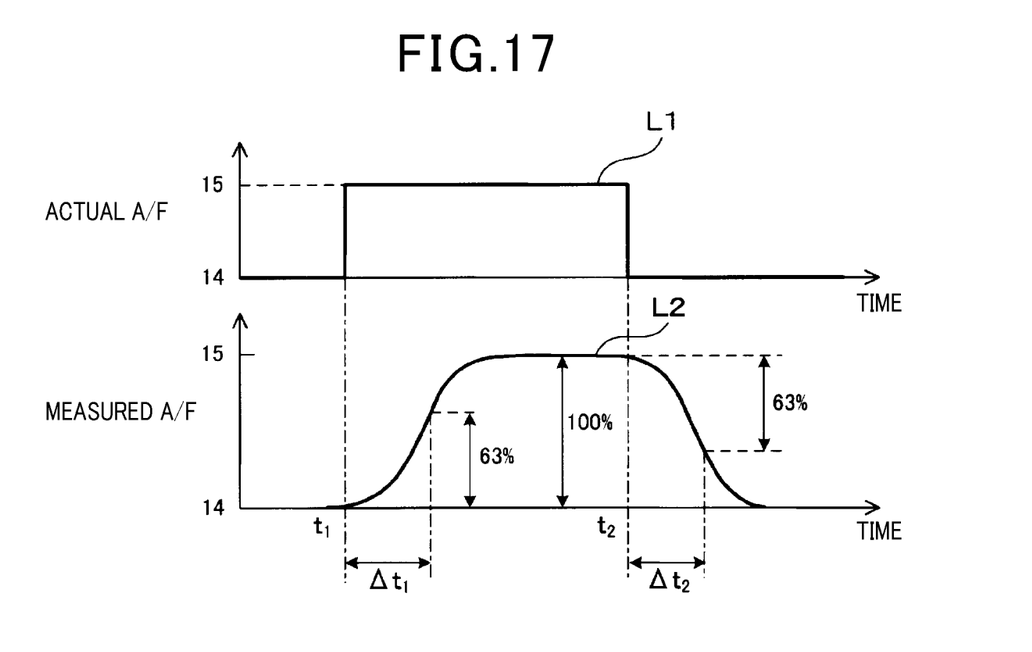
FIG. 17 illustrates the definition of the average response time, according to Example 1.

As illustrated in FIGS. 15 to 17, in this example, various gas sensors having approximately the same basic configuration as the gas sensors in the first and second embodiments were placed in an exhaust pipe of an actual engine and the responsiveness of each was evaluated. Unless specially indicated, of the reference signs used in this example and the drawings related to this example, the reference signs identical to those used in the first embodiment represent components that are the same as in the first embodiment.

In the testing, each gas sensor was placed in an exhaust pipe of a 2.5 L inline-four engine. Then, the engine was operated at an rpm of 1000 rev/min. A state in which the air-fuel ratio (A/F) in an air-fuel mixture supplied to the engine became 14 was formed alternately with a state where the same became 15. The element temperature of the gas sensor was taken to be 750° C.

At this time, the value of A/F that was actually measured by a gas sensor was investigated. In other words, as illustrated by the line L1 in FIG. 17, when the air-fuel ratio of the engine at time t1 shifted from 14 to 15, lapse of time was measured from t1 to a time point when the value of A/F measured by the gas sensor represented by the line L2 increased by 63% during the transition from 14 to 15 (in other words, until the value of A/F became 14.63). Then, the time lag between this measured time and the time t1 was calculated as the response time Δt1.

Moreover, when the air-fuel ratio (line L1) of the engine at time t2 shifted from 15 to 14, the time was measured from time t2 until the value of A/F (line L2) measured by the gas sensor decreased by 63% from 15 toward 14 (in other words, until the value of A/F became 14.37). Then, the time lag between this measured time and the time t2 was calculated as the response time Δt2.

These calculations were repeated and the average value of multiple response times Δt1 and multiple response times Δt2 was calculated and taken to be the average response time T for each gas sensor.

For each of the plurality of gas sensors, the shape of the inner cover 41, the shape of the outer cover 42, the position, size, number, and the like of the inner side surface hole 51, inner bottom surface holes 52, outer side surface holes 61, and outer bottom surface holes 62 were changed in various ways. As a result, for each of the plurality of gas sensors, the ratio of the total surface area of the outer side surface holes 61 with respect to the total surface area of the inner bottom surface holes 52 (total surface area ratio), and the total area of the inner side surface holes 51 were changed in various ways.

Measurements of the testing of this example are given in FIGS. 15 and 16. FIG. 15 is a graph illustrating measurements as a relationship between the total surface area ratio and the average response time T. Moreover, FIG. 16 is a graph illustrating measurements as a relationship between the total surface area of the inner side surface holes 51 and the average response time T.

As can be seen from FIG. 15, when the total surface area ratio is 8 or greater, the average response time T is reduced to 800 ms (milliseconds) or less. Moreover, when the total surface area ratio is 11 or greater, the average response time T is reduced to 750 ms or less. Furthermore, when the total surface area ratio is 16 or greater, the average response time T is reduced to 700 ms or less.

As can be seen from FIG. 16, when the total surface area of the inner side surface holes 51 ranges from 2 to 8 mm$^2$, the average response time T is reduced to 800 ms or less. Moreover, when the total surface area of the inner side surface holes 51 is 3 to 7 mm$^2$, the average response time T is reduced to 750 ms or less.

Furthermore, when the total surface area of the inner side surface holes 51 is 3.5 to 6 mm$^2$, the average response time T is reduced to 700 ms or less.

Example 2

Figure 18:
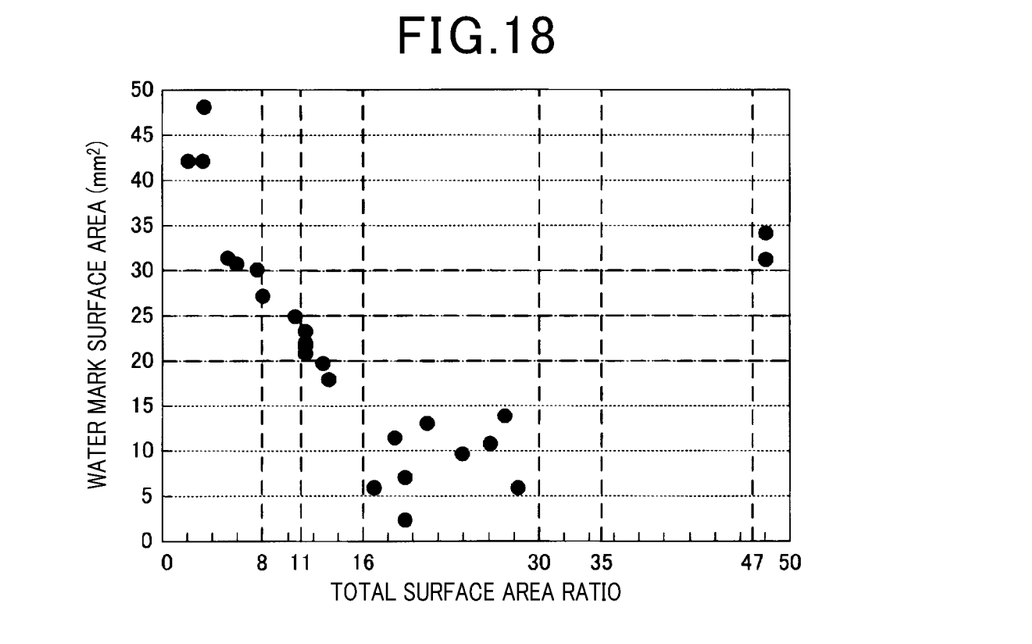
FIG. 18 is a graph illustrating the test results of the relationship between the total surface area ratio and the surface area of the water mark, according to Example 2.
Figure 19:
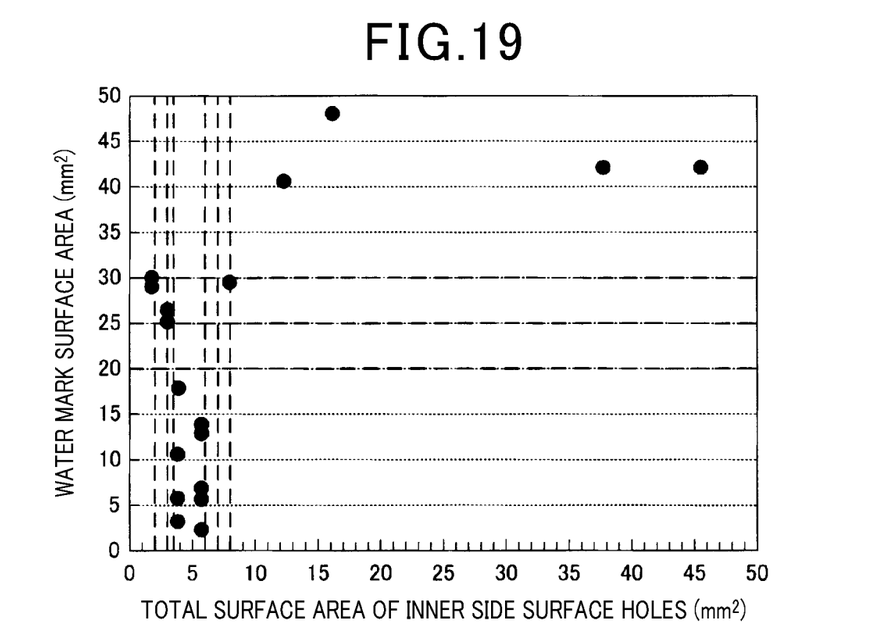
FIG. 19 is a graph illustrating the test results of the relationship between the total surface area of the inner side surface holes and the surface area of the water mark, according to Example 2.

As illustrated in FIGS. 18 and 19, in this example, the liquid adhesion prevention function of a gas sensor was evaluated. First, as in Example 1, a plurality of gas sensors were prepared of which the shape of the inner cover 41, the shape of the outer cover 42, and the position, size, and number of inner side surface holes 51, inner bottom surface holes 52, outer side surface holes 61, and outer bottom surface holes 62 were changed in various ways. Then, water adhesion (liquid adhesion) testing was performed.

The water adhesion testing was performed using the following procedure according to the water adhesion confirmation testing method disclosed in detail in JP-A-2007-225592. In other words, a gas sensor was attached to a pipe that was inclined with respect to the horizontal plane. Then, using an injector, air that included water droplets was injected multiple times from an opening on the top end of the pipe. The surface area of the water mark on the sensor element 2 that was housed inside the gas sensor was measured.

The test results are illustrated in FIGS. 18 and 19. FIG. 18 is a graph illustrating measurements as a relationship between the total surface area ratio and the water mark surface area. FIG. 19 is a graph illustrating measurements as a relationship between the total surface area of the inner side surface holes 51 and the water mark surface area.

As can be seen from FIG. 18, when the total surface area ratio is 8 to 47, the surface area of the water mark is reduced to less than 30 mm$^2$. Moreover, when the total surface area ratio is 11 to 35, the surface area of the water mark is reduced to less than 25 mm$^2$. Furthermore, the total surface area ratio is 16 to 30, the surface area of the water mark is reduced to less than 20 mm$^2$.

As can be seen from FIG. 19, when the total surface area of the inner side surface holes 51 is 2 to 8 mm$^2$, the surface area of the water mark is reduced to less than 30 mm$^2$. Moreover, when the total surface area of the inner side surface holes 51 is 3 to 7 mm$^2$, the surface area of the water mark is reduced to less than 25 mm$^2$. Furthermore, when the total surface area of the inner side surface holes 51 is 3.5 to 6 mm$^2$, the surface area of the water mark is reduced to less than 20 mm$^2$.

From the results described above, it is seen that both high responsiveness and a liquid adhesion prevention function of the gas sensor are achieved when the ratio of the total surface area of the outer side surface holes 61 with respect to the total surface area of the inner bottom surface holes 52 (total surface area ratio) is 8 to 47, and the total surface area of the inner side surface holes 51 is 2 to 8 mm$^2$. It can also be seen that the responsiveness and liquid adhesion prevention function of the gas sensor are further improved by further narrowing down the total surface area ratio and total surface area of the inner side surface holes 51 described above to a specified range.

In the examples above, gas sensors having a cup-shaped sensor element that is cylindrically shaped with a bottom have been described. However, the present disclosure may be applied to gas sensors having another layer layered onto a plate or rod-shaped solid electrolyte body.

REFERENCE SIGNS LIST

1: gas sensor, 2: sensor element, 21: solid electrolyte body, 22; measuring electrode, 23: reference electrode, 3: housing, 4: element cover, 41: inner cover, 42: outer cover, 411: inner side wall section, 412: inner bottom wall section, 421: outer side wall section, 422: outer bottom wall section, 51: inner side surface holes, 52: inner bottom surface holes, 61: outer side surface holes, 62: outer bottom surface holes, Z: axial direction.

What is claimed is:

1. A gas sensor comprising:
a sensor element that has an oxygen ion conductive solid electrolyte body, and a measuring electrode and reference electrode that are respectively provided on one surface and another surface of the solid electrolyte body;
a housing into which the sensor element is inserted; and
an element cover disposed on the tip-end side of the housing; wherein
the element cover has an inner cover disposed so as to cover the tip-end section of the sensor element from the outer-peripheral side and from the tip-end side, and an outer cover disposed so as to cover the inner cover from the outer-peripheral side and from the tip-end side, the inner cover being composed of a single cover and the outer cover being composed of a single cover;
the inner cover has an inner side wall section along the axial direction, and an inner bottom wall section that is provided on the tip-end side of the inner side wall section and intersects with the axial direction;
the outer cover has an outer side wall section along the axial direction, and an outer bottom wall section that is provided on the tip-end side of the outer side wall section and intersects with the axial direction;
inner side surface holes formed in the inner side wall section are positioned further on the base-end side than the measuring electrode;
outer side surface holes formed in the outer side wall section are positioned further on the tip-end side than the inner side surface holes;
inner bottom surface holes formed in the inner bottom wall section are positioned further on the tip-end side than the measuring electrode;
outer bottom surface holes formed in the outer bottom wall section are positioned on an outer side of the inner bottom surface holes;
the ratio of the total surface area of the outer side surface holes with respect to the total surface area of the inner bottom surface holes is 8 to 47;
the total surface area of the inner side surface holes is 2 to 8 mm$^2$; and
the outer bottom surface holes formed in the outer bottom wall section are positioned on a radially outer side of the inner bottom surface holes as the gas sensor is viewed along the axial direction.

2. The gas sensor according to claim 1, wherein the ratio of the total surface area of the outer side surface holes with respect to the total surface area of the inner bottom surface holes is 11 to 35.

3. The gas sensor according to claim 2, wherein the ratio of the total surface area of the outer side surface holes with respect to the total surface area of the inner bottom surface holes is 16 to 30.

4. The gas sensor according to claim 1, wherein the total surface area of the inner side surface holes is 3 to 7 mm$^2$.

5. The gas sensor according to claim 4, wherein the total surface area of the inner side surface holes is 3.5 to 6 mm$^2$.

6. The gas sensor according to claim 1, wherein the inner bottom surface holes are formed in the inner bottom wall section that intersects the axial direction.

7. The gas sensor according to claim 1, wherein the sensor element is a cup shape that is a cylindrical shape with a bottom, the tip-end side thereof being closed, and the base-end side thereof being open.

8. The gas sensor according to claim 1, wherein the gas sensor is a rear gas sensor located downstream of a catalytic filter in an exhaust system of an internal combustion engine.

9. The gas sensor according to claim 1, wherein the gas sensor is a limiting current type gas sensor that outputs a limiting current that depends on the concentration of a specified gas in a gas to be measured, with the application of a specified voltage across the measuring electrode and the reference electrode.

10. A gas sensor comprising:
a sensor element that has an oxygen ion conductive solid electrolyte body, and a measuring electrode and reference electrode that are respectively provided on one surface and another surface of the solid electrolyte body;
a housing into which the sensor element is inserted; and
an element cover disposed on the tip-end side of the housing; wherein
the element cover has an inner cover disposed so as to cover the tip-end section of the sensor element from the outer-peripheral side and from the tip-end side, and an outer cover disposed so as to cover the inner cover from the outer-peripheral side and from the tip-end side, the inner cover being composed of a single cover and the outer cover being composed of a single cover;
the inner cover has an inner side wall section along the axial direction, and an inner bottom wall section that is provided on the tip-end side of the inner side wall section and intersects with the axial direction;
the outer cover has an outer side wall section along the axial direction, and an outer bottom wall section that is provided on the tip-end side of the outer side wall section and intersects with the axial direction;
inner side surface holes formed in the inner side wall section are positioned further on the base-end side than the measuring electrode;
outer side surface holes formed in the outer side wall section are positioned further on the tip-end side than the inner side surface holes;
inner bottom surface holes formed in the inner bottom wall section are positioned further on the tip-end side than the measuring electrode;
outer bottom surface holes formed in the outer bottom wall section are positioned on an outer side of the inner bottom surface holes;
the ratio of the total surface area of the outer side surface holes with respect to the total surface area of the inner bottom surface holes is 8 to 47;
the total surface area of the inner side surface holes is 2 to 8 mm$^2$; and
an outer surface of the inner side wall section of the inner cover directly faces an inner surface the outer side wall section of the outer cover without an intervening cover.

11. A gas sensor comprising:
a sensor element that has an oxygen ion conductive solid electrolyte body, and a measuring electrode and reference electrode that are respectively provided on one surface and another surface of the solid electrolyte body;
a housing into which the sensor element is inserted; and
an element cover disposed on the tip-end side of the housing; wherein
the element cover has an inner cover disposed so as to cover the tip-end section of the sensor element from the outer-peripheral side and from the tip-end side, and an outer cover disposed so as to cover the inner cover from the outer-peripheral side and from the tip-end side, the inner cover being composed of a single cover and the outer cover being composed of a single cover;
the inner cover has an inner side wall section along the axial direction, and an inner bottom wall section that is provided on the tip-end side of the inner side wall section and intersects with the axial direction;
the outer cover has an outer side wall section along the axial direction, and an outer bottom wall section that is provided on the tip-end side of the outer side wall section and intersects with the axial direction;
inner side surface holes formed in the inner side wall section are positioned further on the base-end side than the measuring electrode;
outer side surface holes formed in the outer side wall section are positioned further on the tip-end side than the inner side surface holes;
inner bottom surface holes formed in the inner bottom wall section are positioned further on the tip-end side than the measuring electrode;
outer bottom surface holes formed in the outer bottom wall section are positioned on an outer side of the inner bottom surface holes;
the ratio of the total surface area of the outer side surface holes with respect to the total surface area of the inner bottom surface holes is 8 to 47;
the total surface area of the inner side surface holes is 2 to 8 mm$^2$; and
an outer surface of the inner bottom wall section of the inner cover directly faces an inner surface the outer bottom wall section of the outer cover without an intervening cover.

* * * * *